(12) United States Patent
Carteri et al.

(10) Patent No.: US 8,271,934 B2
(45) Date of Patent: Sep. 18, 2012

(54) DEVELOPING SOFTWARE APPLICATIONS WITH INCREASED MODULARITY

(75) Inventors: Francesco Maria Carteri, Roma (IT); Alessandro Donatelli, Rome (IT); Rosario Gangemi, Rome (IT); Antonio Perrone, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1132 days.

(21) Appl. No.: 12/138,639

(22) Filed: Jun. 13, 2008

(65) Prior Publication Data

US 2008/0313599 A1 Dec. 18, 2008

(51) Int. Cl.
*G06F 9/44* (2006.01)
(52) U.S. Cl. ........ 717/104; 717/105; 717/108; 717/113; 717/121
(58) Field of Classification Search .................. None
See application file for complete search history.

(56) References Cited

U.S. PATENT DOCUMENTS

| | | |
|---|---|---|
| 7,243,086 B2 | 7/2007 | Polak |
| 7,434,200 B2 | 10/2008 | Bender |
| 7,478,362 B2 * | 1/2009 | Gutz et al. ............... 717/104 |
| 7,673,283 B2 | 3/2010 | Gutz et al. |
| 7,676,786 B2 | 3/2010 | Shenfield et al. |
| 7,840,935 B2 * | 11/2010 | Fildebrandt et al. ......... 717/105 |
| 7,873,942 B2 | 1/2011 | Shaburov et al. |
| 7,954,083 B2 | 5/2011 | Berenbach et al. |
| 7,979,840 B2 | 7/2011 | Zhang et al. |
| 2004/0003369 A1 * | 1/2004 | Gonos ........................ 717/100 |
| 2005/0108684 A1 * | 5/2005 | Sohn et al. .................. 717/120 |
| 2005/0132326 A1 * | 6/2005 | Chischportich et al. ...... 717/106 |
| 2005/0132343 A1 * | 6/2005 | Bender ....................... 717/145 |
| 2005/0137992 A1 * | 6/2005 | Polak ........................... 706/13 |
| 2006/0010429 A1 * | 1/2006 | Ihara ........................... 717/126 |
| 2006/0059027 A1 * | 3/2006 | Berenbach et al. ............ 705/7 |
| 2006/0101376 A1 * | 5/2006 | Gutz et al. .................... 717/104 |

(Continued)

FOREIGN PATENT DOCUMENTS

EP 1457877 A2 9/2004

(Continued)

OTHER PUBLICATIONS

GOMAA, "Designing Concurrent, Distributed, and Real-Time Applications with UML," ICSE '06, Shanghai, China, May 20-28, 2006, pp. 1059-1060.

(Continued)

*Primary Examiner* — Isaac Tecklu
(74) *Attorney, Agent, or Firm* — Yee & Associates, P.C.; Jeffrey S. LaBaw

(57) ABSTRACT

A solution is proposed for developing software applications on a data processing system. A corresponding method starts with the step of providing an analysis model of a software application (such as based on a use case diagram); the analysis model represents the software application with stereotypes (i.e., use cases) each one representing a requirement of the software application. The method continues by estimating an optimum number of features of the software application (each one representing a function of the software application); the optimum number of features is estimated according to the analysis model. The stereotypes are then organized in packages; each package includes a set of logically correlated stereotypes, which expose a corresponding feature. A number of the packages are determined according to the optimum number of features and used to implement the software application.

9 Claims, 12 Drawing Sheets

U.S. PATENT DOCUMENTS

| | | |
|---|---|---|
| 2006/0168555 A1 | 7/2006 | Represas Ferrao et al. |
| 2007/0006134 A1* | 1/2007 | Larvet et al. .................. 717/104 |
| 2007/0168936 A1* | 7/2007 | Shaburov et al. ............. 717/106 |
| 2007/0198968 A1 | 8/2007 | Shenfield et al. |
| 2008/0127047 A1* | 5/2008 | Zhang et al. .................. 717/104 |
| 2008/0229303 A1 | 9/2008 | Carteri et al. |

FOREIGN PATENT DOCUMENTS

| | | |
|---|---|---|
| EP | 1684170 A2 | 7/2006 |
| EP | 1724681 A1 | 11/2006 |
| WO | 0020968 A2 | 4/2000 |
| WO | 03038609 A1 | 5/2003 |
| WO | 2004010292 A1 | 1/2004 |

OTHER PUBLICATIONS

GOMAA, "Designing Software Product Lines with UML," Department of Information and Software Engineering, George Mason University, Fairfax, Virginia, Jun. 2004, 56 pages.

USPTO Office Action dated Jul. 26, 2011, regarding U.S. Appl. No. 12/1048,355, 9 pages.

* cited by examiner

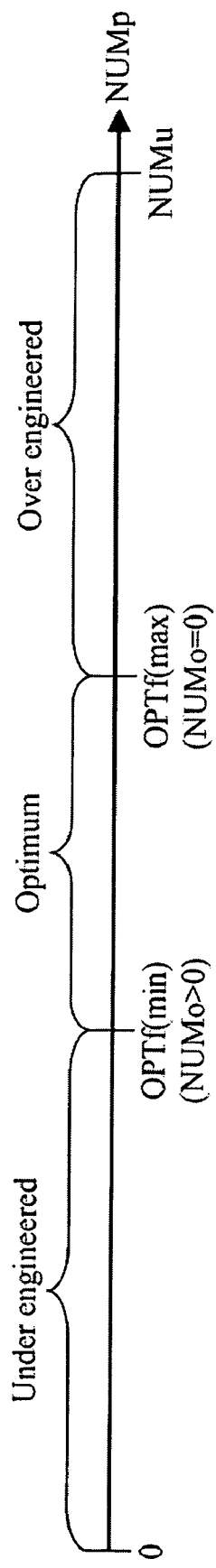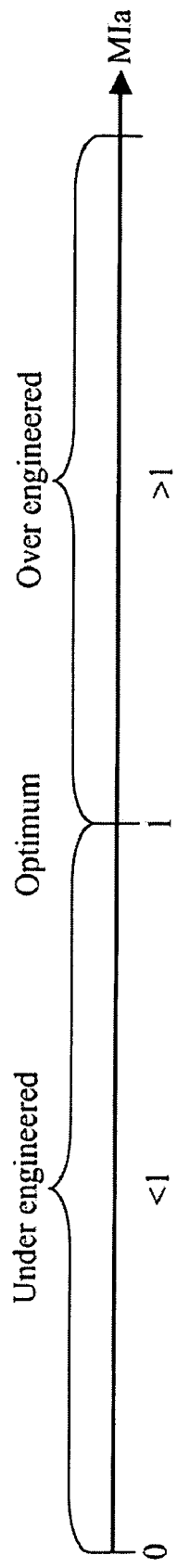
FIG.2A
FIG.2B

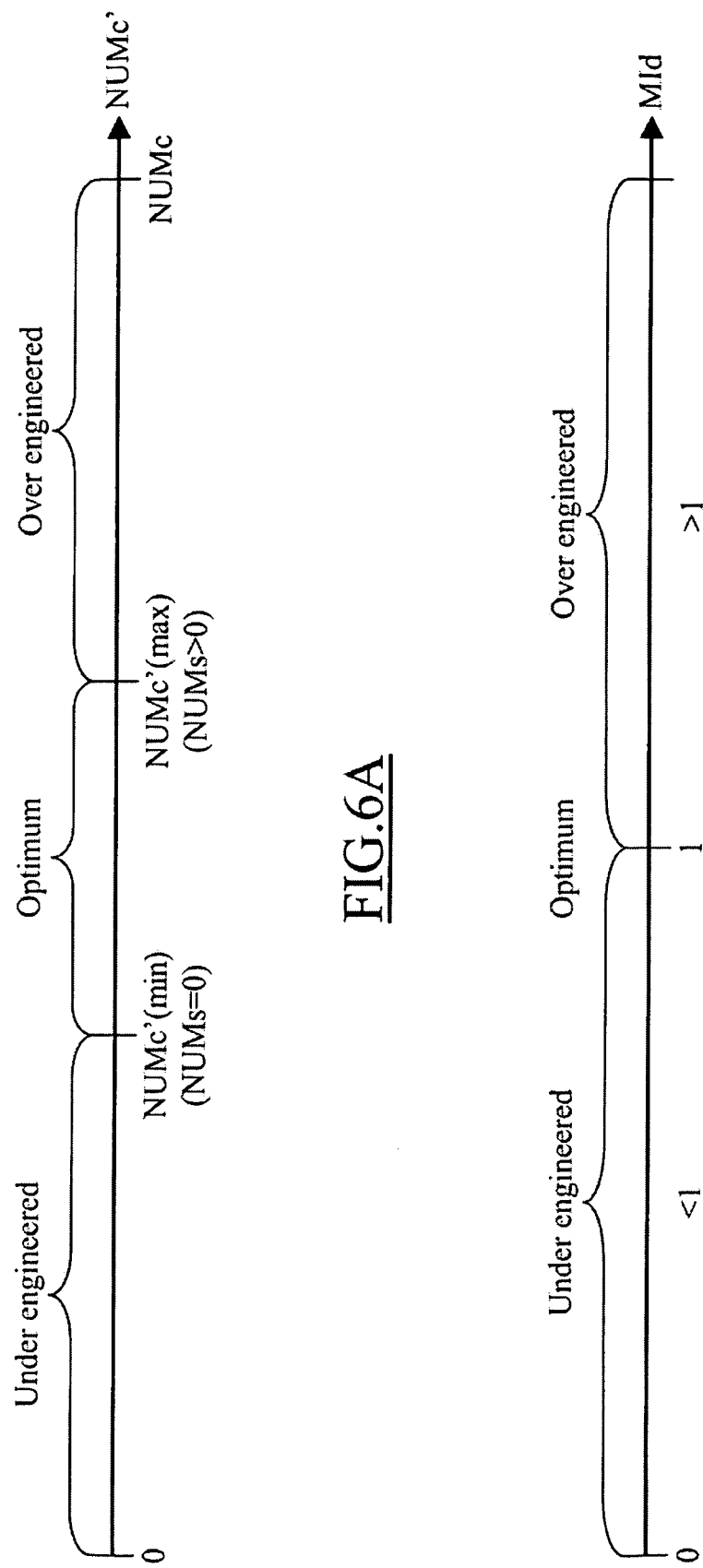

DEVELOPING SOFTWARE APPLICATIONS WITH INCREASED MODULARITY

FIELD OF THE INVENTION

The present invention relates to the data processing field. More specifically, the present invention relates to the development of software applications.

BACKGROUND

The development of software applications is a very critical activity; the problem is particular acute for large software applications, especially when they are intended to run in heterogeneous network environments or have multi-layer architectures.

For this purpose, several modeling tools are available to aid formalizing the developing process. Generally, a modeling tool is used to define a series of models (for example, of the UML type); each model consists of an abstraction, which provides a simplified representation of a real aspect of the software application. In this way, it is possible to visualize, assess and communicate the software application before its actual implementation (so as to reduce the risks of the corresponding development). Typically, the modeling tool also provides an Integrated Development Environment (IDE), which facilitates the generation of the corresponding code; in this way, the software application can be created and maintained in a very simple, safe and time effective manner. An example of commercial modeling tool is the "Rational Rose" by IBM Corporation.

Moreover, several software engineering techniques have also been proposed to master the inherent complexity of the developing process. Particularly, a consolidated practice is of decomposing the software application into multiple modules. Each module consists of an independent part of the software application serving a specific purpose; the different modules cooperate among them to produce the overall behavior of the software application.

In this way, preexisting modules may be reused for developing the software application (rather than creating them ex-novo). The possibility of assembling reused modules reduces the developing time and cost; moreover, the reused modules are generally largely tested, so that their exploitation results in software applications that are more robust, fault tolerant and reliable. An evolution of the above-described technique consists of providing modules that can be shared among multiple software applications; in this way, a single copy of each shared module is used and maintained for multiple software applications, with a corresponding reduction in system resource consumption.

However, no support is provided by the existing modeling tools for managing the task of decomposing the software application efficiently into suitable modules. Therefore, the definition of the modules of the software application still remains a substantial manual activity, which is mainly based on an investigation process requiring a heavy human intervention; as a consequence, the obtained results strongly depend on personal skills, and in any case are not repeatable and prone to errors.

The above-mentioned drawbacks adversely affect the quality of the development process. Indeed, it is not possible to ascertain the actual degree of modularity of the software application (apart from a mere feeling based on personal experiences). As a result, the software application may result under engineered when it includes a too low number of modules (which do not allow exploiting the advantages of the above-mentioned modular approach); conversely, the software application may result over engineered when it includes a too high number of modules (which overload the software application without any tangible advantage). Moreover, this may lead to problems in the exploitation of the software applications—such as for the management of their (installation and/or runtime) prerequisites, footprint issues, and the like.

SUMMARY

In its general terms, the present disclosure is based on the idea of measuring the modularity of the software applications.

Particularly, different aspects of the present invention provide a solution as set out in the independent claims. Advantageous embodiments of the invention are described in the dependent claims.

More specifically, an aspect of the invention proposes a method for developing software applications (on a data processing system). The method starts with the step of providing an analysis model of a software application (such as based on a use case diagram); the analysis model represents the software application with stereotypes (i.e., use cases), each one representing a requirement of the software application. The method continues by estimating an optimum number of features of the software application (each one representing a function of the software application); the optimum number of features is estimated according to the analysis model. The stereotypes are then organized in packages; each package includes a set of logically correlated stereotypes, which expose a corresponding feature. A number of the packages is determined according to the optimum number of features. It is now possible to implement the software application according to the packages.

In an embodiment of the invention, this result is achieved by optimizing an analysis index (indicative of a comparison between the optimum number of features and the number of the packages).

A suggested algorithm for calculating the optimum number of features is based on the different types of stereotypes (such as kernel, internal and optional stereotypes).

Typically, the stereotypes are use cases (each one representing a scenario enabled by the software application).

As a further improvement, it is possible to generate a design model of the software application from the analysis model (representing the software application with artifacts, each one implementing a service offered by the software application); in this case, a number of the artifacts corresponds to the number of the packages.

As above, in an embodiment of the invention this result is achieved by optimizing a design index (indicative of a comparison between the number of the artifacts and the number of the packages).

A suggested algorithm for calculating this design index is based on a relevant number of the artifacts, which is defined according to the different types thereof (such as core and specific artifacts).

Typically, the artifacts are deployable components (each one adapted to be deployed to a target data processing entity for installing the software application).

Another aspect of the invention proposes a computer program for performing the above-described method.

A different aspect of the invention proposes a corresponding system.

BRIEF DESCRIPTION OF THE DRAWINGS

The invention itself, as well as further features and the advantages thereof, will be best understood with reference to the following detailed description, given purely by way of a non-restrictive indication, to be read in conjunction with the accompanying drawings, in which:

FIGS. 2A-2B are explanatory diagrams of the solution according to an embodiment of the invention, FIGS. 6A-6B are further explanatory diagrams of the solution according to an embodiment of the invention.

DETAILED DESCRIPTION

Figure 1:
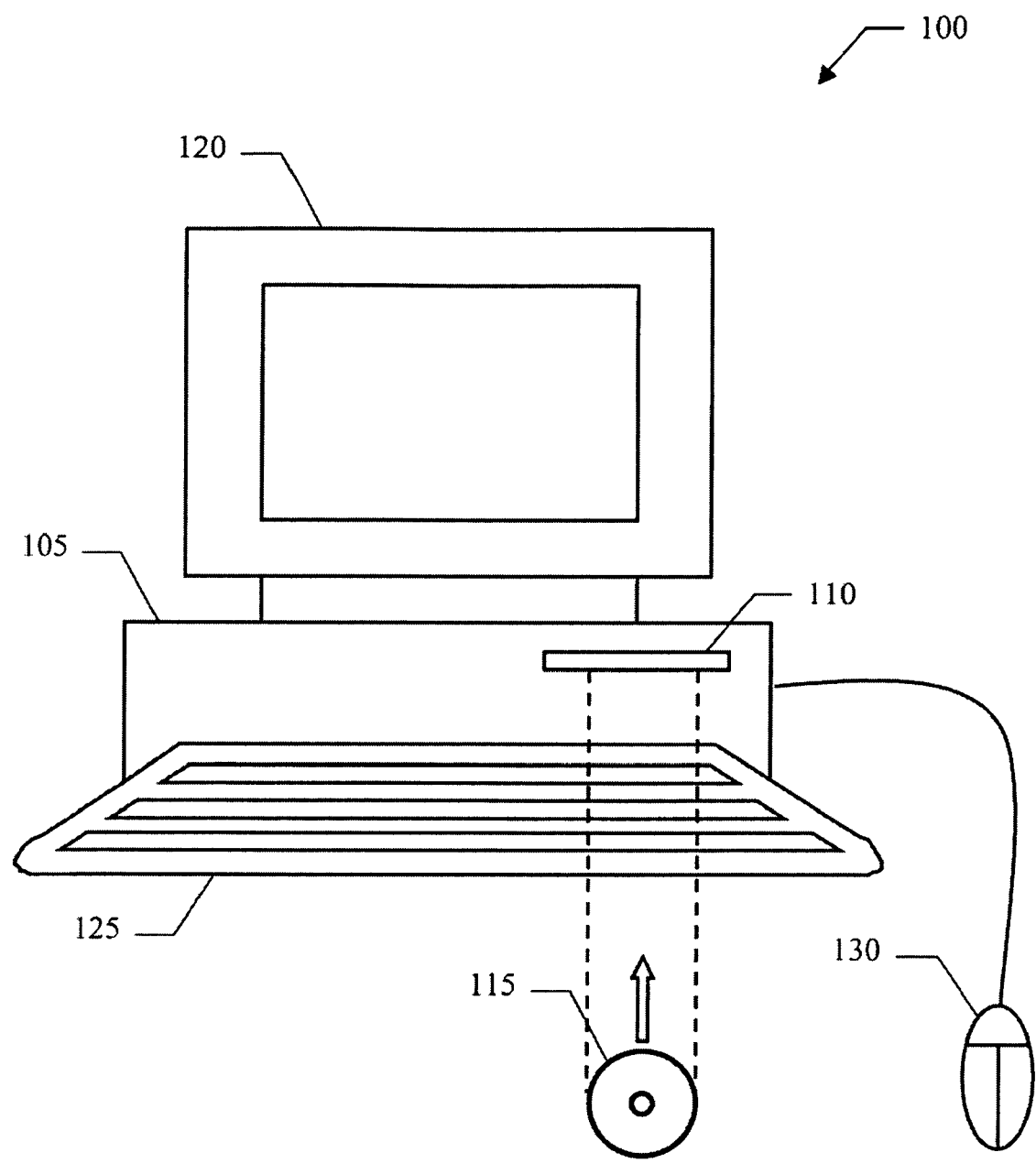
FIG. 1 is a pictorial representation of a computer that may be used to implement the solution according to an embodiment of the invention.

With reference in particular to FIG. 1, a computer 100 (for example, consisting of a PC) is illustrated. The computer 100 includes a central unit 105, which houses the electronic circuits controlling its operation (such as a microprocessor and a working memory). The computer 100 is also provided with a hard-disk and a drive 110 for reading CD-ROMs 115. A monitor 120 is used to display images on its screen. Operation of the computer 100 is controlled by means of a keyboard 125 and a mouse 130, which are connected to the central unit 105 in a conventional manner.

The computer 100 may be used to develop generic software applications. Typically, the corresponding development process includes a sequence of modeling phases—for example, conforming to the Model Driven Architecture (MDA) specification; in this way, the software application is represented with a series of models, which provide different levels of abstraction of real aspects thereof. For example, the models are defined by using the Unified Modeling Language (UML); the UML is a standard modeling language, which provides a (graphical and textual) syntax and an underlying semantic for specifying all the aspects relating to the development of software applications (especially of the object-oriented type).

Generally, the development process starts with an analysis phase, which is aimed at specifying the requirements of the software application; for this purpose, the requirements are collected from corresponding users, checked for completeness and consistency, and then formalized into a proper definition. The analysis phase generates a corresponding analysis model—referred to as Platform Independent Model (PIM) in the MDA specification. The analysis model represents the software application with interrelated stereotypes, each one for a respective requirement of the software application. For example, the stereotypes consist of use cases, which represent scenarios enabled by the software application; the use cases expose features, each one representing a function of the software application.

In the solution according to an embodiment of the present invention, as described in detail in the following, an optimum number of features is estimated according to the analysis model. The use cases are then organized in packages, whose number is determined according to the optimum number of features; each package includes a set of logically correlated use cases, which expose a corresponding feature.

In this way, the software application (which will be implemented according to the analysis model so obtained) may be efficiently decomposed into independent modules (for its different features). Therefore, the modularity of the software application is strongly improved; this fosters the reusing and/or the sharing of the modules among different software applications.

The proposed solution allows automating (at least partially) the task of decomposing the software application into suitable modules. As a consequence, the obtained results are less dependent on human skills (so as to become more repeatable and less prone to errors).

All of the above has a beneficial effect on the quality of the development process. Particularly, this facilitates the formalization of the degree of modularity of the software application (so as to allow ascertain objectively when it is under engineered or over engineered). Moreover, this reduces the problems in the exploitation of the software applications—such as for the management of their (installation and/or runtime) prerequisites, footprint issues, and the like.

For this purpose, an embodiment of the present invention proposes the definition of a modularity index MIa (for the analysis phase); the modularity index MIa provides an indication of how the requirements of the software application are grouped to highlight commonality and variability. Particularly, the modularity index MIa is equal to the ratio between the number of packages defined in the analysis model (NUMp) and the optimum number of features (OPTf):

$$MIa = NUMp / OPTf.$$

In turn, the optimum number of features OPTf is calculated according to the different types of use cases included in the analysis model. More specifically, the use cases may be of a kernel type, when they represent requirements that are mandatory for the software application; for example, when the software application is available in different editions (such as home, professional, basic and advanced) or in different versions (such as for corresponding architectures and platforms), these use cases represent the kernel of the software application—relating to the scenarios that are shared among its different editions/versions. Moreover, the use cases may be internal, when they represent scenarios that are not directly associated with a user of the software application (such as relating to its internal operation), and at the same time they have a behavior included in another use case in a non-shared way. At the end, the use cases may be optional (i.e., not strictly necessary, so that they may be missing in some configurations of the software application); each optional use case may be either independent of the other use cases or dependent on one or more of them—when their implementation is required to enable the scenario of the (dependent) use case. The optimum number of features OPTf is equal to the number of the use cases different from the kernel, internal and dependent optional use cases plus 1. For this purpose, the set of the kernel use cases, the set of the internal use cases and the set of the dependent optional use cases are subtracted from the set of all the use cases; the cardinality of the resulting set plus 1 then provides the desired value; particularly, assuming that the sets of the different types of use cases are disjoined, the optimum number of features OPTf will be:

$$OPTf = NUMu - (NUMk - 1) - NUMi - NUMo,$$

where NUMu is the total number of the use cases, NUMk is the number of the kernel use cases, NUMi is the number of the internal use cases, and NUMo is the number of the dependent optional use cases. Therefore, the optimum number of features OPTf ranges from a maximum value OPTf(max)—when NUMo=0—to a minimum value OPTf(min)—when NUMo>0.

In this way, the optimum number of features OPTf is based on the number of use cases in the analysis model. This value is reduced according to the kernel uses cases, which can be organized into a single package (as indicated by the addition of the unity in the above-mentioned formula), since they are always necessary. The same value is also reduced according to the internal use cases; indeed, the nature of the internal use cases makes it preferable their aggregation with other use cases in the corresponding package(s). At the end, a further reduction factor is given by the optional use cases that are dependent on other use cases; this avoids adding packages with limited individual value.

As shown in FIG. 2A, the optimum number of features OPTf is generally lower than the number of use cases NUMu (thanks to the alleviating factors of the kernel, internal and dependent optional use cases). The software application is correctly engineered when the number of packages NUMp is equal to the optimum number of features OPTf—in the range OPTf(min)-OPTf(max) according to its dependent optional use cases. Conversely, the software application is over engineered (i.e., the use cases expose many different features) when the number of packages NUMp is higher than the (maximum) optimum number of features OPTf; instead, the software application is under engineered (i.e., the use cases expose only a few features) when the number of packages NUMp is lower than the (minimum) optimum number of features OPTf.

This result is quantified by the modularity index MIa. Indeed, as shown in FIG. 2B, the software application is correctly engineered when the modularity index MIa is equal to 1; conversely, the software application is over engineered when the modularity index MIa is higher than 1, and it is under engineered when the modularity index MIa is lower than 1.

Figure 3A:
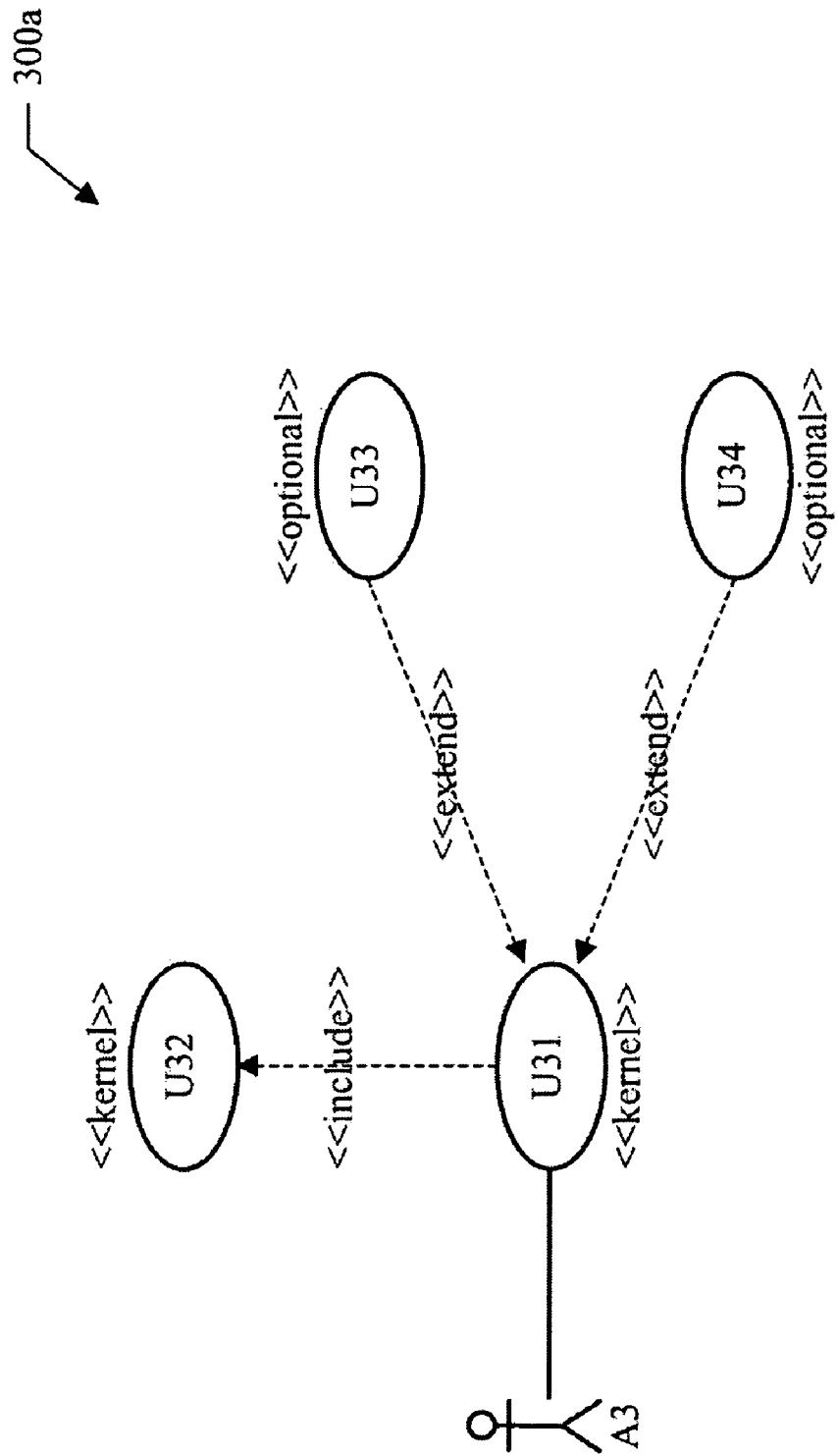
FIGS. 3A-3C, 4A-4B, and 5A-5B illustrate exemplary applications of the solution according to an embodiment of the invention.
Figure 3B:
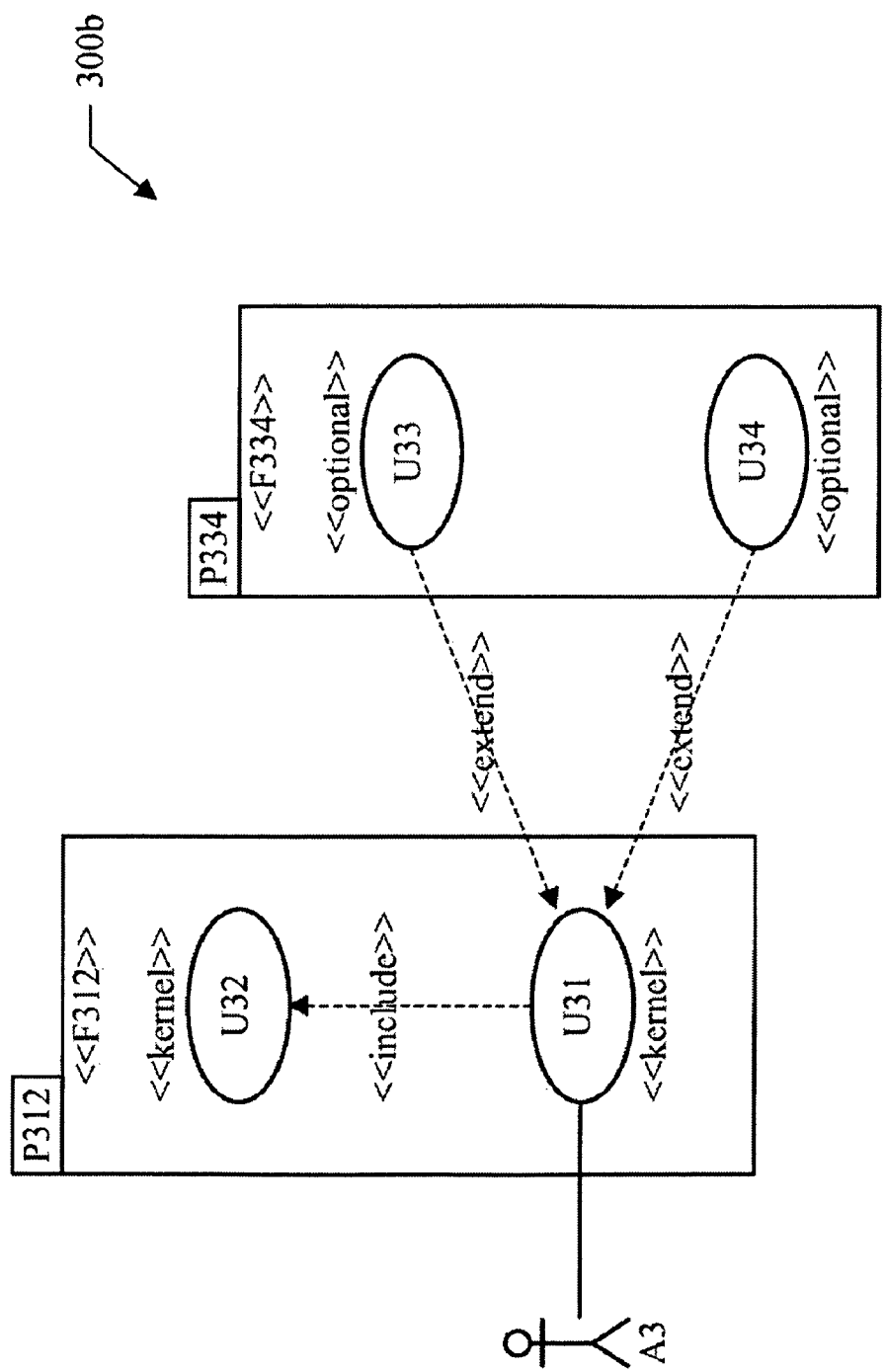
Figure 3C:
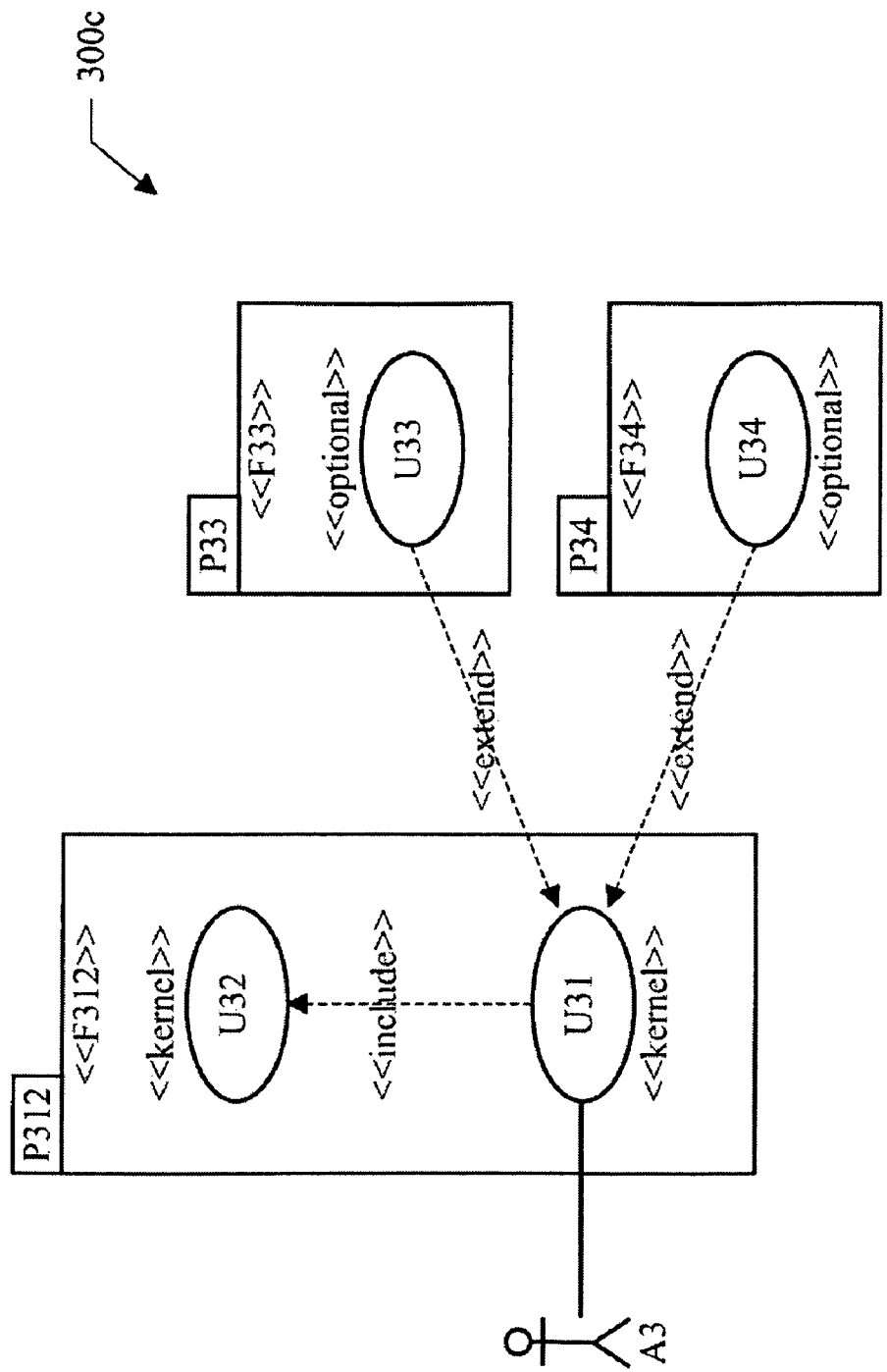

An exemplary application of the above-described solution is illustrated in FIGS. 3A-3C. Particularly, FIG. 3A shows a diagram 300a representing an analysis model graphically. In detail, an actor A3 plays the role of a user of the software application. The actor A3 carries out a kernel use case U31 (as indicated by a corresponding association). The use case U31 includes another kernel use case U32—as indicated by a corresponding dependency, represented with a dashed-line arrow, meaning that the behavior of the (target) use case U32 is part of the one of the (source) use case U31. Moreover, two independent optional use cases U33 and U34 extend the same use case U31—as indicated by corresponding dependencies, represented with dashed-line arrows, meaning that the (source) use cases U33,U34 implement a variation of the (target) use case U31 with the addition of further functionality.

In this case, the optimum number of features OPTf is equal to the number of use cases (U31-U34) different from the kernel uses cases (U31,U32), the internal use cases (U32) and the dependent optional use cases (none) plus 1—i.e., OPTf=3.

Moving to FIG. 3B, the use cases U31 and U32 are organized into a package P312 exposing a (common) feature F312—as indicated by a tabbed folder; likewise, the use cases U33 and U34 are organized into another package P334 exposing an (optional) feature F334. Therefore, the modularity index MIa of the analysis model represented by the diagram so obtained (denoted with 300b) is equal to:

MIa=NUMp/OPTf=2/3=0.7.

This means that the analysis model of the diagram 300b is under engineered (MIa=0.7<1); this is due to the grouping of the two independent optional use cases U33 and U34 into the same package P334 (which exposes a single feature F334 for both of them).

Conversely, as shown in FIG. 3C, the use cases U33 and U34 are instead organized into corresponding packages P33 and P34 exposing (optional) features F33 and F34, respectively (while the use cases U31 and U32 are again organized into the package P312 exposing the feature F312). Therefore, the modularity index MIa of the analysis model represented by the diagram so obtained (denoted with 300c) is now equal to:

MIa=NUMp/OPTf=3/3=1.

This means that the analysis model of the diagram 300c is correctly engineered, since the independent optional use cases U33 and U34 are now arranged in different packages (P33 and P34) exposing the corresponding features (F33 and F34).

Figure 4A:
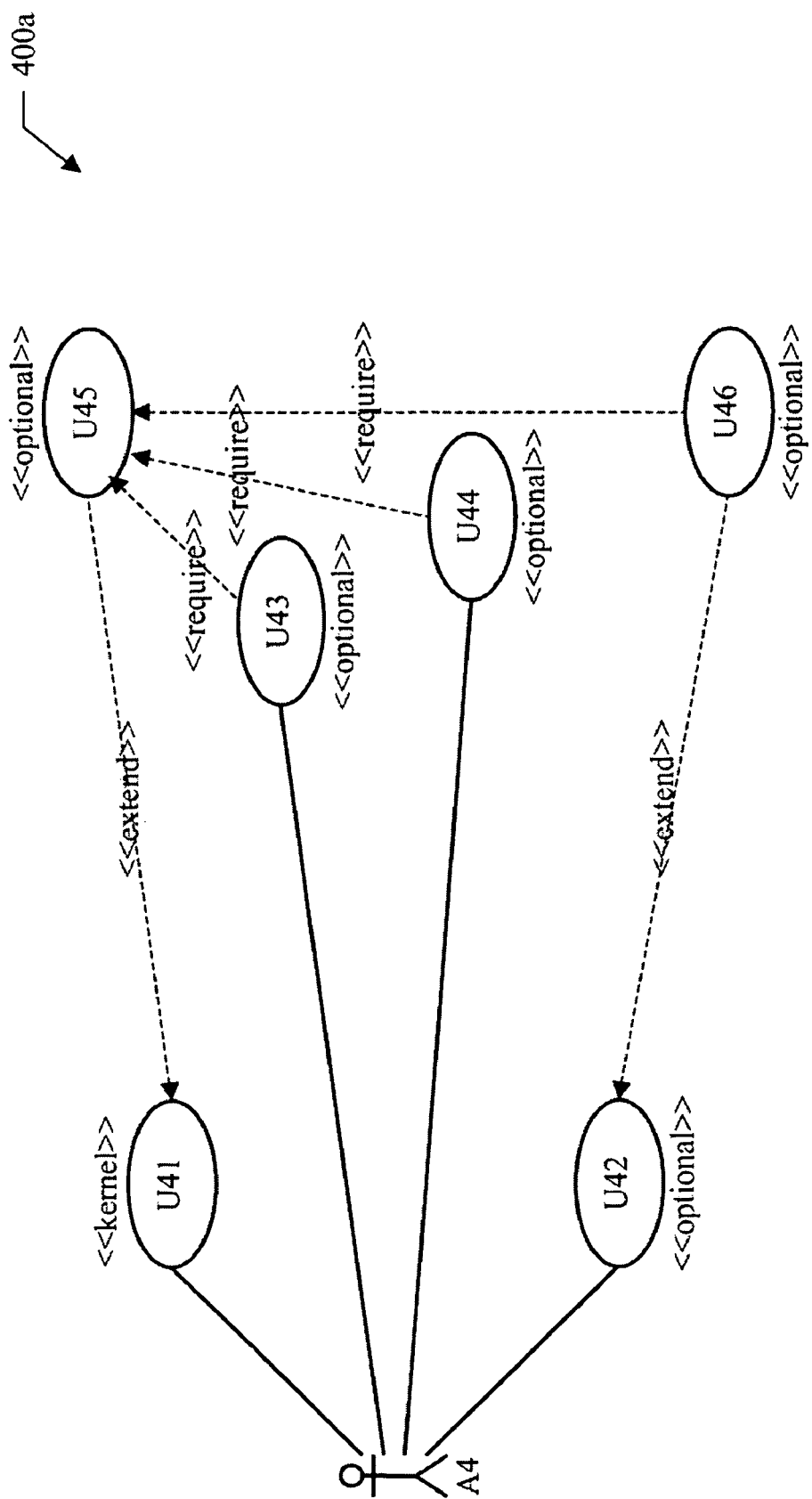
Figure 4B:
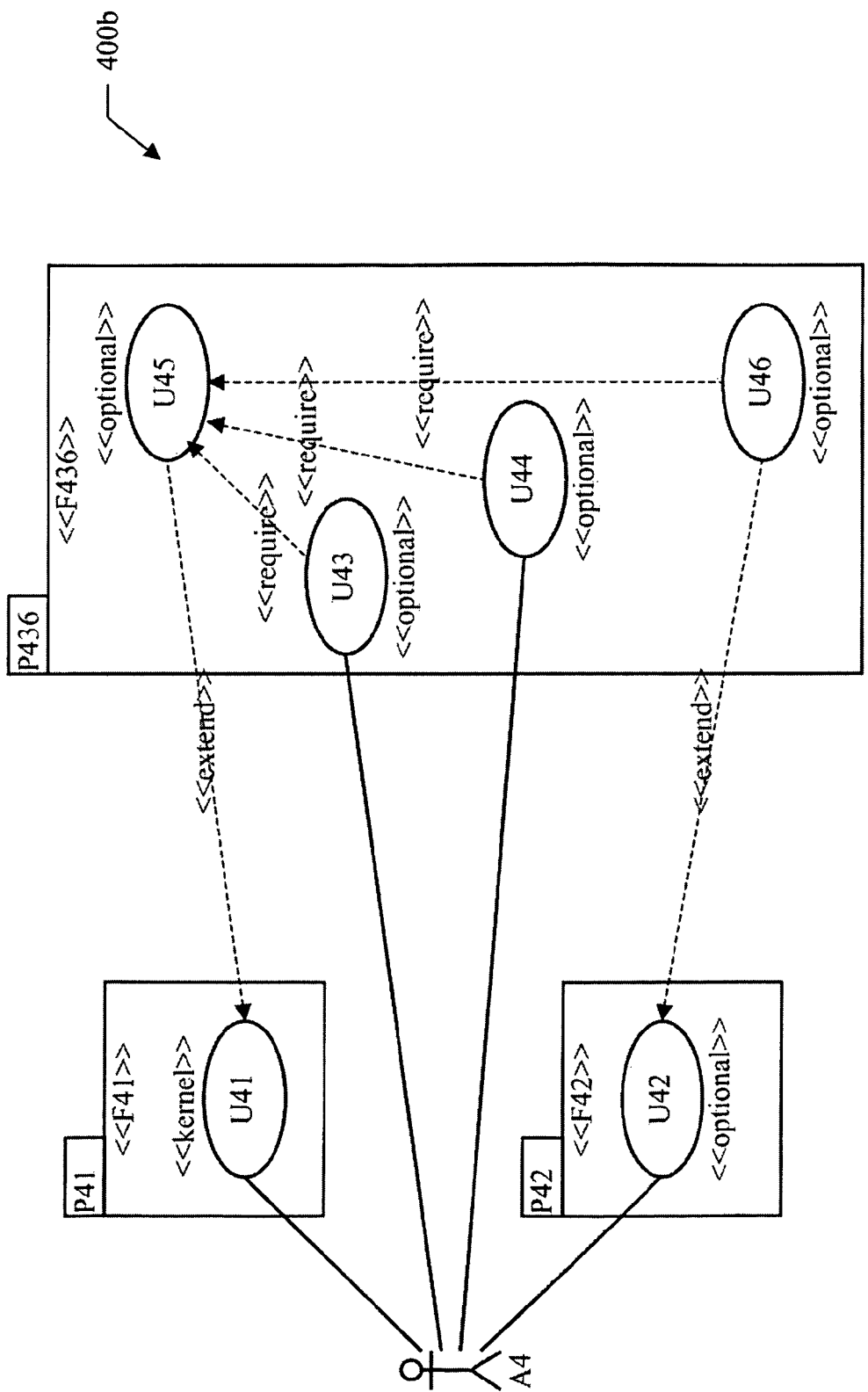

Another exemplary application of the same solution is illustrated in FIGS. 4A-4B. Particularly, FIG. 4A shows a use case diagram 400a again with an actor A4 playing the role of a user of the software application. The actor A4 now carries out a kernel use case U41, an independent optional use case U42 and two dependent optional use cases U43 and U44; particularly, both the use cases U43 and U44 require another independent optional use case U45—as indicated by corresponding dependencies, represented with dashed-line arrows, meaning that the (target) use case U45 is mandatory for the implementation of the (source) use cases U43 and U44. The use case U45 in turn extends the use case U41. Another dependent optional use case U46 requires the same use case U45; moreover, the use case U46 also extends the use case U42.

In this case, the optimum number of features OPTf is equal to the number of use cases (U41-U46) different from the kernel uses cases (U41), the internal use cases (none) and the dependent optional use cases (U43,U44,U46) plus 1—i.e., OPTf=3.

Moving to FIG. 4B, the use case U41 is organized into a corresponding package P41 exposing a (common) feature F41, and the use case U42 is organized into a corresponding package P42 exposing an (optional) feature F42; the use cases U43, U44, U45 and U46 are instead organized into a single package P436 exposing an (optional) feature F436. Therefore, the modularity index MIa of the analysis model represented by the diagram so obtained (denoted with 400b) is equal to:

MIa=NUMp/OPTf=3/3=1.

This means that the analysis model of the diagram 400b is correctly engineered; as can be seen, the desired result is achieved grouping the dependent optional use cases U43, U43 and U46 together with the use case U45 which they depend on (since the arrangement in different packages would be of no value).

Figure 5A:
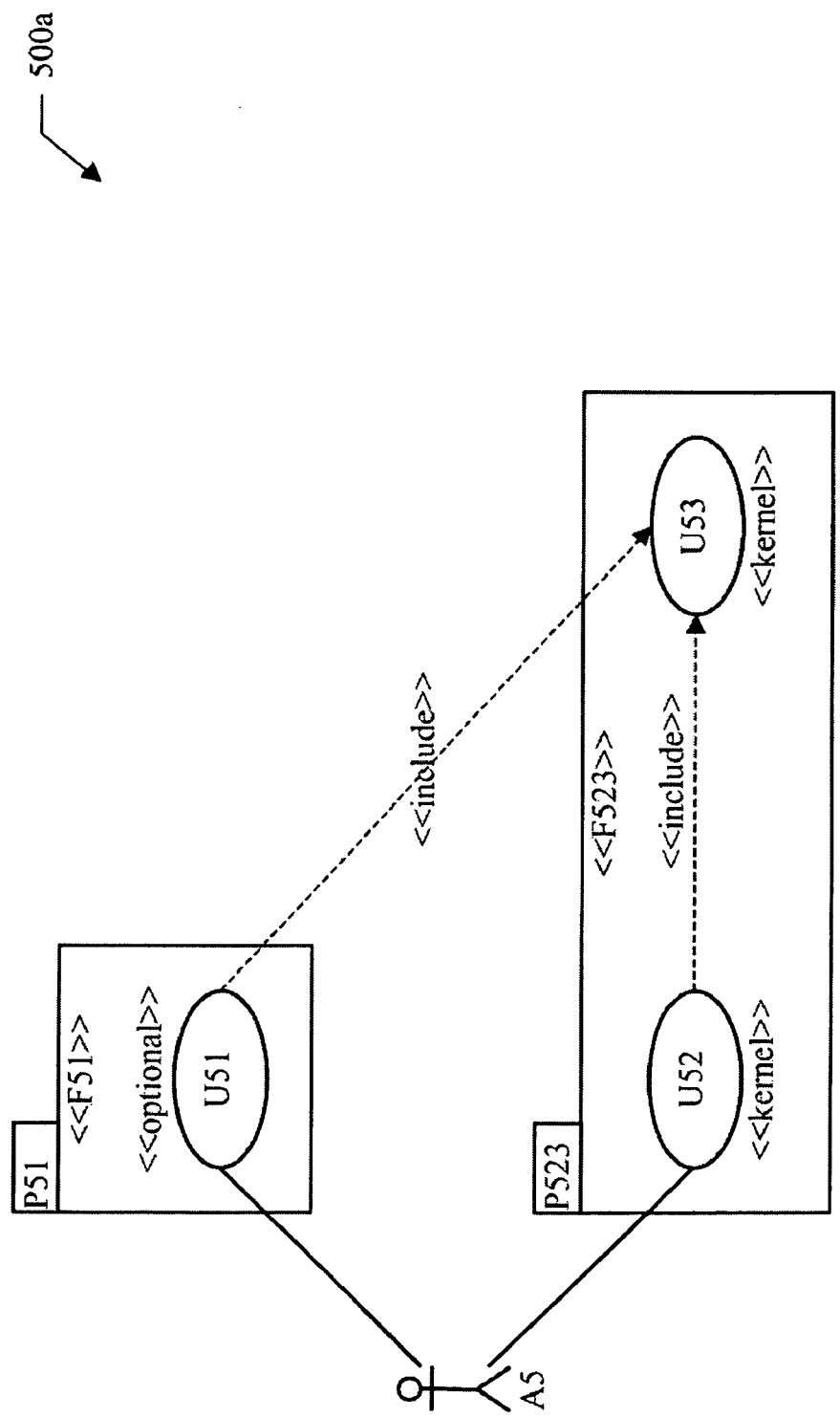
Figure 5B:
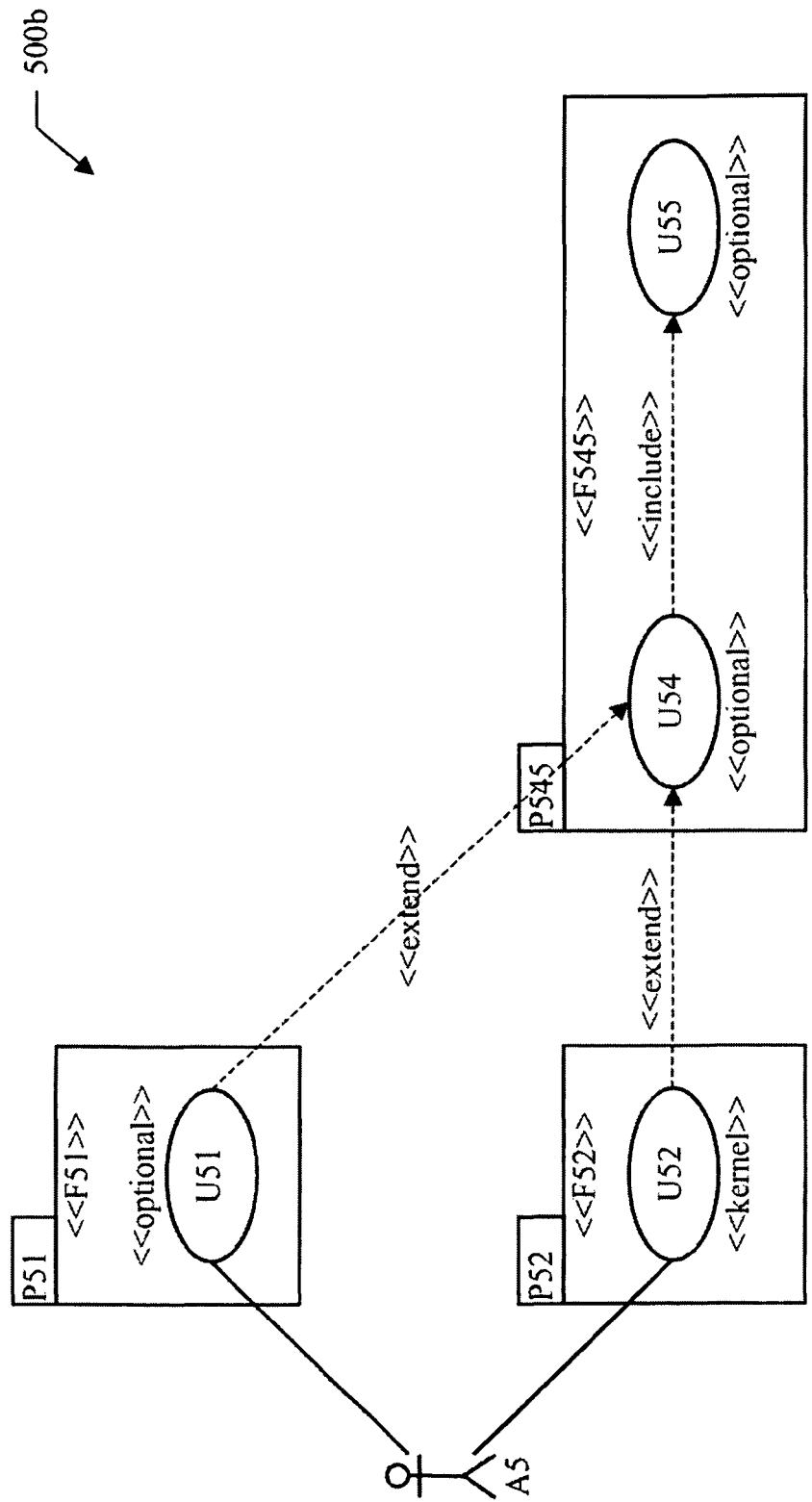

A further exemplary application of the proposed solution is illustrated in FIGS. 5A-5B. Particularly, FIG. 5A shows a use case diagram 500a again with an actor A5 playing the role of a user of the software application. The actor A5 now carries out an independent optional use U51 and a kernel use case U52; both the use cases U51 and U52 include a further kernel use case U53. The use case U51 is organized into a package P51 exposing an (optional) feature F51; the use cases U52 and U53 are instead organized into a package P523 exposing a (common) feature F523.

In this case, the optimum number of features OPTf is equal to the number of use cases (U51-U53) different from the kernel uses cases (U52,U53), the internal use cases (U53) and the dependent optional use cases (none) plus 1—i.e., OPTf=2. Therefore, the modularity index MIa of the analysis model represented by the diagram 500a is equal to:

$$MIa=NUMp/OPTf=2/2=1,$$

meaning that the analysis model of the diagram 500a is correctly engineered.

Alternatively, as shown in FIG. 5B, the same software application may also be modeled with another analysis model represented by a diagram 500b. In this case, the same actor A5 again carries out the independent optional use case U51 and the kernel use case U52; however, the use cases U51 and U52 now extend a further optional use case U54, which in turn includes another independent optional use case U55. The use case U51 is again organized into the package P51 exposing the feature F51; the use case U52 is instead organized into a corresponding package P52 exposing a (common) feature F52, while the use cases U54 and U55 are organized into another package P545 exposing an (optional) feature F545.

The optimum number of features OPTf is equal to the number of use cases (U51-U55) different from the kernel use cases (U52), the internal use cases (U55) and the dependent optional use cases (none) plus 1—i.e., OPTf=3. Therefore, the modularity index MIa of the analysis model represented by the diagram 500b is equal to:

$$MIa=NUMp/OPTf=3/3=1,$$

meaning that the analysis model of the diagram 500b is again correctly engineered. However, this use case is preferable (with respect to the preceding one) since it provides a higher number of packages exposing corresponding features (for the same modularity index MIa).

The development process generally continues (after the above-described analysis phase) with a design phase, which is aimed at specifying the actual architecture of the software application (based on its implementation technology). The design phase generates a corresponding design model (starting from the analysis model)—referred to as Platform Dependent Model (PDM) in the MDA specification. The design model represents the software application with interrelated artifacts, each one exposing one or more features (to implement a respective service offered by the software application); for example, the artifacts consist of components (in turn including classes, interfaces, objects, and the like), which components are adapted to be deployed to another computer for installing the software application.

In an embodiment of the present invention, as described in detail in the following, the number of the components in the design model is defined according to the number of features (i.e., packages) in the analysis model. This further facilitates the decomposition of the software application (which will be implemented according to the design model so obtained) into the correct modules—i.e., components (with the above-mentioned advantages).

For this purpose, there is proposed the definition of a further modularity index MId (for the design phase); the modularity Index MId provides an indication of how the modularity of the software application is reflected in its specific implementation. Particularly, the modularity index MId is equal to the ratio between a relevant number of components (NUMc') and the number of features (NUMf):

$$MId=NUMc'/NUMf.$$

In turn, the relevant number of components NUMc' is calculated according to the different types of components included in the design model. More specifically, the components may be of a core type, when they represent functions that are mandatory for the software application (i.e., relating to kernel use cases). Moreover, the components may be specific, when they do not implement functional services of the software application; for example, the specific components relate to basic services (such as for logging and security aspects) or to platform-related services (such as for stand-alone and client-server architectures). The relevant number of components NUMc' is equal to the number of the components different from the core and specific components plus 1. For this purpose, the set of the core components and the set of the specific components are subtracted from the set of all the components; the cardinality of the resulting set plus 1 then provides the desired value; particularly, assuming that the sets of the different types of components are disjoined, the relevant number of components NUMc' will be:

$$NUMc'=NUMc-(NUMr-1)-NUMs,$$

where NUMc is the total number of the components, NUMr is the number of the core components, and NUMs is the number of the specific components. Therefore, the relevant number of components NUMc' ranges from a maximum value NUMc'(max)—when NUMs=0—to a minimum value NUMc'(min)—when NUMs>0.

In this way, the components to be taken into account in the comparison with the features are reduced according to the core components and the specific components. Indeed, it is expected that the components derive logically from the features, so that each feature should be traced by a corresponding component with a well-defined public interface. However, at least one more core component (as indicated by the addition of the unity in the above-mentioned formula) is always necessary (with the possibility of sharing it among different versions/editions of the software application). Moreover, specific components may be further added—since they are already available (when relating to basic services) or to be used in alternative (when relating to platform-related services).

As shown in FIG. 6A, the relevant number of components NUMc' is generally lower than the number of components NUMc (thanks to the alleviating factors of the core and specific components). The software application is correctly engineered when the relevant number of components NUMc'—in the range NUMc'(min)-NUMc'(max) according to its specific components—is equal to the number of features NUMf. Conversely, the software application is over engineered (i.e., many components implement the features) when the relevant number of components NUMc' is higher than the number of features NUMf; instead, the software application is under engineered (i.e., only a few components implement the features) when the relevant number of components NUMc' is lower than the number of features NUMf.

This result is quantified by the modularity index MId. Indeed, as shown in FIG. 6B, the software application is correctly engineered when the modularity index MId is equal to 1; conversely, the software application is over engineered when the modularity index MId is higher than 1, and it is under engineered when the modularity index MId is lower than 1.

Figure 7:
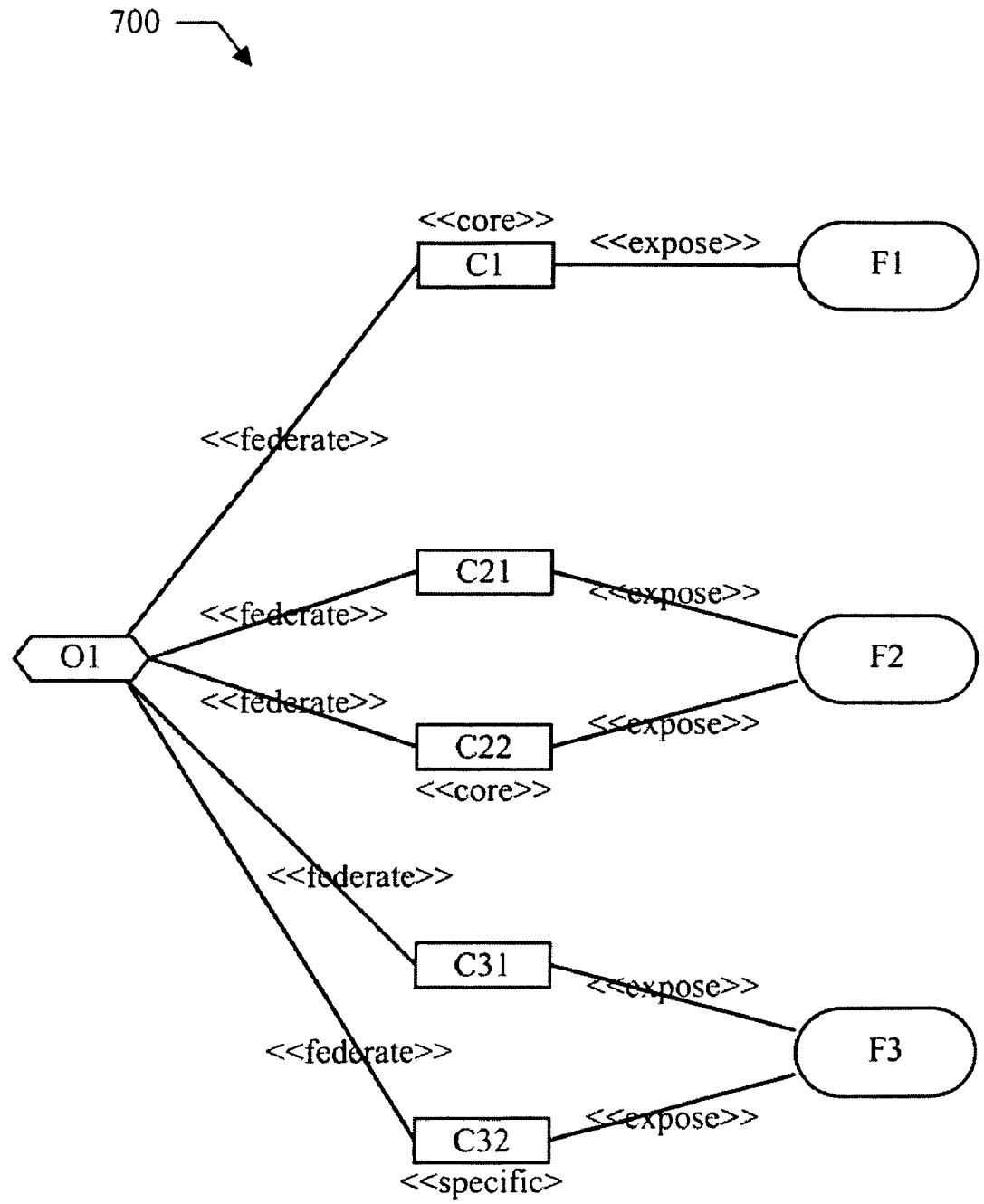
FIG. 7 illustrates another exemplary application of the solution according to an embodiment of the invention.

An exemplary application of the above-described solution is illustrated in FIG. 7, which shows a diagram 700 representing a design model graphically. In detail, the software application exposes three features F1, F2, and F3. The feature F1 is implemented by a single core component C1 (as indicated by a corresponding association). The feature F2 is instead implemented by a corresponding component C21 with the addition of a further core component C22. At the end, the feature F3 is implemented by a corresponding component C31 with the addition of a specific component C32. The components C1-C32 are federated into an offering O1 (as indicated by further associations).

In this case, the number of relevant components NUMc' is equal to the number of components (C1-C32) different from the core components (C1,C22) and the specific components (C32) plus 1—i.e., NUMc'=3.

Therefore, the design model of the diagram 700 is correctly engineered (MId=3/3=1); indeed, each feature is implemented by a corresponding component (one of them of the core type), disregarding any additional further core components or specific components.

Figure 8:
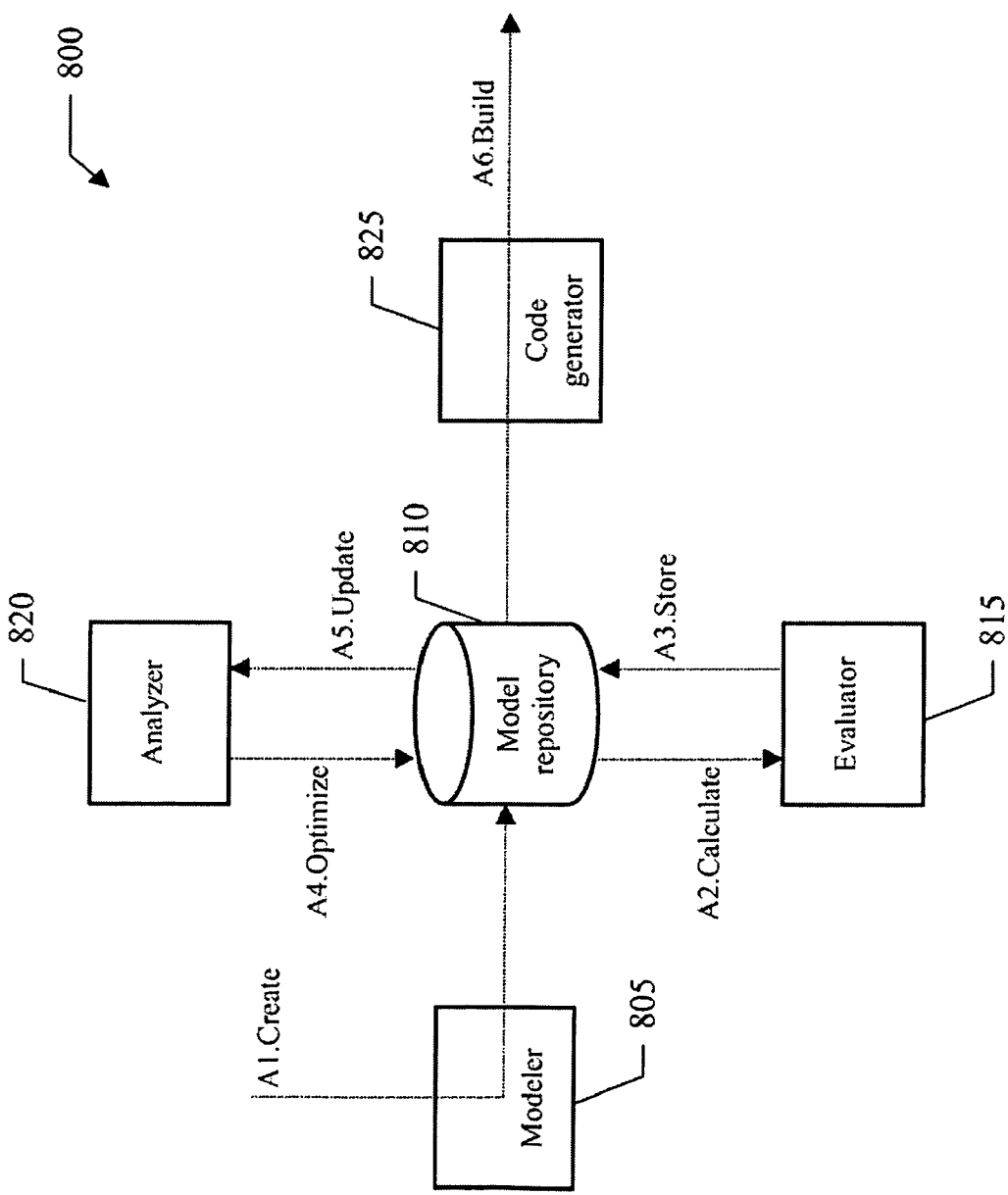
FIG. 8 is a collaboration diagram representing the roles of different software elements that may be used to implement the solution according to an embodiment of the invention.

Moving to FIG. 8, the main software elements that can be used to implement the above-described solution are denoted as a whole with the reference 800. The information (programs and data) is typically stored on the hard-disk and loaded (at least partially) into the working memory of the computer when the programs are running, together with an operating system and other application programs (not shown in the figure). The programs are initially installed onto the hard disk, for example, from CD-ROM. Particularly, the figure describes the static structure of the system (by means of the corresponding elements) and its dynamic behavior (by means of a series of exchanged messages, each one representing a corresponding action, denoted with sequence numbers preceded by the symbol "A").

Particularly, a modeler 805 (such as the above-mentioned "Rational Rose") is used by developers (i.e., architects, analysts, designers, and programmers) to create a series of models for each software application to be built. Typically, the modeler 805 provides a graphical user interface that allows creating, editing, viewing, and performing any other management operations on the diagrams representing the desired models. The definitions of the models are saved into a repository 810, for example, by means of corresponding files in the XML Metadata Interchange (XMI) format (action "A1.Create").

An evaluator 815 accesses the model repository 810; for each analysis and design model, the evaluator 815 calculates the corresponding modularity index MIa and MId, respectively (action "A2.Calculate"). For this purpose, the evaluator 815 typically exploits a model navigation tool (or simply navigator) of the modeler 805 (such as the "Model Transformation Framework" of the "Rational Rose"). Each modularity index so obtained is then stored into the model repository 810 in association with the corresponding model (action "A3.Store"). This provides a sort of static quality indicators of the models, which can be used to ascertain the actual degree of modularity of the software application under development. It should be noted that the use of two distinct modularity indexes (for the analysis phase and the design phase) allows monitoring the development process during its different modeling phases; for example, this allows detecting a bad modularization of the software application during the design phase (for a specific implementation) following a good modularization thereof during the analysis phase, or vice-versa.

The model repository 810 is also accessed by an analyzer 820. For each analysis and design model, the analyzer 820 determines all its possible configurations—again by exploiting the navigator of the modeler 805; for example, the analyzer 820 takes into account any combinations of the use cases into different packages (for the analysis models) or any combinations of the components adapted to implement the features (for the design models). The analyzer 820 then calculates the relevant modularity index of the different configurations so obtained of the (current) model—by exploiting the evaluator 815. The analyzer 820 can then choose the configuration of the model that optimizes the modularity index (action "A4.Optimize"). For example, this process may be iterated until the difference of the modularity index from its target value (i.e., 1) reaches a predefined threshold (such as +/−0.1-0.2). It should be noted that the implementation of this algorithm is affordable in practice without any problem, since its complexity is linear with respect to the number of stereotypes/artifacts of the models (generally in a relatively low number, such as from some tens to a few hundreds). The chosen configuration of the model is then proposed to the developer; assuming that the developer accepts the proposal of the analyzer 820, the model is updated accordingly in the repository 810 (action "A5.Update").

A code generator 825 is used by the developers to build each software application implementing the corresponding models stored in the repository 805 (action "A6.Build"). The software application so obtained includes different subsystems corresponding to the components of the design model (for example, consisting of files with the definition of the relevant classes); the subsystems are typically embedded into a software package for their distribution to the desired computers where the software application must be installed.

Naturally, in order to satisfy local and specific requirements, a person skilled in the art may apply to the solution described above many logical and/or physical modifications and alterations. More specifically, although the present invention has been described with a certain degree of particularity with reference to preferred embodiment(s) thereof, it should be understood that various omissions, substitutions and changes in the form and details as well as other embodiments are possible. Particularly, the proposed solution may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

Particularly, the proposed solution lends itself to be implemented with an equivalent method (by using similar steps, removing some steps being non-essential, or adding further optional steps); moreover, the steps may be performed in a different order, concurrently or in an interleaved way (at least in part).

Nothing prevents using any other modeling tools to develop the software application (for example, supporting different phases of the development process). In any case, alternative formalisms may be used to define the models of the software application (such a based on Petri networks). Moreover, it is possible to build the actual implementation of the software application from the analysis model so obtained in any other way (for example, directly without creating any design model and/or even completely manually when an IDE is not available).

Alternatively, the modularity index for the analysis phase may be calculated with any other formula indicative of a comparison between the optimum number of features and the number of packages (for example, based on their difference). Moreover, the use of the modularity index only as a quality indicator of the model (without any automatic optimization thereof) is within the scope of the invention.

The proposed algorithm for calculating the optimum number of features must not to be interpreted in a limitative manner. Indeed, the optimum number of features may also be estimated by taking into account additional and/or different types of use cases, or more generally in any other way according to the analysis model (for example, as a function of other relationships—such as "realize", "form", and the like).

In a different embodiment of the invention, the software application may be represented with other analysis models, which include alternative stereotypes for the requirements of the software application (such as based on activity diagrams, statecharts diagrams, and the like).

Similar considerations apply to the design phase; particularly, in this case as well the design model may be defined with alternative formalisms, or the software application may be built in a different way from this model (even manually).

As above, the modularity index of the design phase may be calculated with any other formula indicative of a comparison between the number of components and the number of features (for example, based on their difference). Moreover, the use of the modularity index only as a quality indicator of the model (without any automatic optimization thereof) is again within the scope of the invention.

The proposed algorithm for calculating the relevant number of components must not to be interpreted in a limitative manner. Indeed, the relevant number of components may also be estimated by taking into account additional and/or different types of components (for example, as a function of other relationships).

In a different embodiment of the invention, the software application may be represented with other design models, which include alternative artifacts implementing the services offered by the software application (such as based on class diagrams, object diagrams, and the like).

In any case, it is empathized that the proposed solution lends itself to be applied only at the level of the analysis phase, only at the level of the design phase, or more generally at the level of any other modeling phase(s).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). In any case, the program may take any form suitable to be used by or in connection with any data processing system, such as external or resident software, firmware, or microcode (either in object code or in source code—for example, to be compiled or interpreted). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to an embodiment of the present invention lends itself to be implemented with a hardware structure (for example, integrated in a chip of semiconductor material), or with a combination of software and hardware.

The proposed method may be carried out on a system having a different architecture or including equivalent units (for example, based on a local network). Moreover, the computer may have another structure or may include similar elements (such as cache memories temporarily storing the programs or parts thereof to reduce the accesses to the mass memory during execution); in any case, it is possible to replace the computer with any code execution entity (such as a PDA, a mobile phone, and the like), or with a combination thereof (such as a client/server architecture, a grid computing infrastructure, and the like).

Although in the preceding description reference has been made to a solution with a stand-alone structure, this is not to be intended as a limitation. Indeed, in a different embodiment of the invention the same solution may be implemented by means of a service, which is deployed by a corresponding provider.

The invention claimed is:

1. A method for developing software applications on a data processing system, the method including the steps of:
   providing an analysis model of a software application, the analysis model representing the software application with stereotypes each one representing a requirement of the software application,
   estimating an optimum number of features of the software application each one representing a function of the software application, the optimum number of features being estimated according to the analysis model,
   organizing the stereotypes in packages each one including a set of logically correlated stereotypes exposing a corresponding feature, a number of the packages being determined according to the optimum number of features,
   implementing the software application according to the packages, and
   generating a design model of the software application from the analysis model, the design model representing the software application with artifacts each one implementing a service offered by the software application, a number of the artifacts corresponding to the number of the packages, and wherein the step of implementing the software application includes:
   implementing the software application according to the artifacts.

2. The method according to claim 1, wherein the step of organizing the stereotypes includes:
   optimizing an analysis index indicative of a comparison between the optimum number of features and the number of the packages.

3. The method according to claim 1, wherein the stereotypes includes kernel stereotypes representing mandatory requirements of the software application, internal stereotypes not representing requirements directly associated with a user of the software application and included in another stereotype in a non-shared way, and optional stereotypes representing optional requirements depending on at least another stereotype, and wherein the step of estimating the optimum number of features includes:
   setting the optimum number of features to the number of the stereotypes reduced according to a number of the internal stereotypes, a number of the kernel stereotypes and a number of the optional stereotypes.

4. The method according to claim 1, wherein the stereotypes are use cases each one representing a scenario enabled by the software application.

5. The method according to claim 1, wherein the step of generating the design model includes:
   optimizing a design index indicative of a comparison between the number of the artifacts and the number of the packages.

6. The method according to claim 5, wherein the artifacts include core artifacts implementing mandatory services of the software application, and specific artifacts not implementing functional services of the software application, the step of optimizing the design index including:

setting the design index according to a comparison between a relevant number of the artifacts and the number of the packages, the relevant number of the artifacts being set to the number of the artifacts reduced according to a number of the core artifacts and a number of the specific artifacts.

7. The method according to claim 1, wherein the artifacts are deployable components adapted to be deployed to a target data processing entity for installing the software application.

8. A computer program product comprising a tangible computer-usable storage medium having program code stored thereon for performing a method for developing software applications on a data processing system when the program code is executed on the data processing system, the method including the steps of:

providing an analysis model of a software application, the analysis model representing the software application with stereotypes each one representing a requirement of the software application, estimating an optimum number of features of the software application each one representing a function of the software application, the optimum number of features being estimated according to the analysis model, organizing the stereotypes in packages each one including a set of logically correlated stereotypes exposing a corresponding feature, a number of the packages being determined according to the optimum number of features, implementing the software application according to the packages, and generating a design model of the software application from the analysis model, the design model representing the software application with artifacts each one implementing a service offered by the software application, a number of the artifacts corresponding to the number of the packages, and wherein the step of implementing the software application includes:

implementing the software application according to the artifacts.

9. A system including processor and memory for developing software applications on a data processing system, the system further including a computer program which when executed on the system performs a method comprising the steps of:

providing an analysis model of a software application, the analysis model representing the software application with stereotypes each one representing a requirement of the software application, estimating an optimum number of features of the software application each one representing a function of the software application, the optimum number of features being estimated according to the analysis model, organizing the stereotypes in packages each one including a set of logically correlated stereotypes exposing a corresponding feature, a number of the packages being determined according to the optimum number of features, and implementing the software application according to the packages, wherein the stereotypes includes kernel stereotypes representing mandatory requirements of the software application, internal stereotypes not representing requirements directly associated with a user of the software application and included in another stereotype in a non-shared way, and optional stereotypes representing optional requirements depending on at least another stereotype, and wherein the step of estimating the optimum number of features includes:

setting the optimum number of features to the number of the stereotypes reduced according to a number of the internal stereotypes, a number of the kernel stereotypes and a number of the optional stereotypes.

* * * * *